(12) United States Patent
Chen et al.

(10) Patent No.: US 8,213,169 B2
(45) Date of Patent: Jul. 3, 2012

(54) SLIDING HINGE AND A PORTABLE ELECTRONIC DEVICE

(75) Inventors: Wei-Chun Chen, Taipei Hsien (TW); Ruei-Lin Jhu, Taipei Hsien (TW); Shiunn-Jyh Chu, Taipei Hsien (TW)

(73) Assignee: Shin Zu Shing Co., Ltd. (TW)

( * ) Notice: Subject to any disclaimer, the term of this patent is extended or adjusted under 35 U.S.C. 154(b) by 614 days.

(21) Appl. No.: 12/481,566

(22) Filed: Jun. 9, 2009

(65) Prior Publication Data

US 2010/0309135 A1    Dec. 9, 2010

(51) Int. Cl.
*G06F 1/16* (2006.01)

(52) U.S. Cl. ............... 361/679.27; 248/692; 16/364; 312/249.11

(58) Field of Classification Search ............... 16/273, 16/342, 387, 362, 364, 239, 361; 345/168, 345/169, 204; 248/479, 49, 304, 343, 692; 379/433.13; 361/679.01, 679.06, 679.21, 361/679.58, 679.27, 679.09, 679.55, 759, 361/752, 801; 455/575.1, 575.4; 312/319.2, 312/327, 325, 249.11, 249.8, 258, 274, 243
See application file for complete search history.

(56) References Cited

U.S. PATENT DOCUMENTS 6,434,791 B1 * 8/2002 Chung .................. 16/387
7,779,509 B2 * 8/2010 Jian .................... 16/359

* cited by examiner

*Primary Examiner* — Hung Duong
(74) *Attorney, Agent, or Firm* — Hershkovitz & Associates, LLC

(57) ABSTRACT

A sliding hinge for a portable electronic device has a stationary leaf, a link assembly, a main sliding leaf and a side sliding leaf. The linking assembly is mounted pivotally on the stationary leaf via a pivoting middle. The main and side sliding leaves are connected respectively to two ends of the linking assembly. With the linking assembly, the main and side sliding leaves are moved simultaneously. Therefore, when the portable electronic device is not used, the main and side sliding leaves fully overlap with the stationary leaf to achieve a smallest footprint. When the portable electronic device performs multiple functions, the main and side sliding leaves are slid out to reveal control buttons.

17 Claims, 10 Drawing Sheets

US 8,213,169 B2

SLIDING HINGE AND A PORTABLE ELECTRONIC DEVICE

BACKGROUND OF THE INVENTION

1. Field of the Invention

The present invention relates to a sliding hinge, especially to a sliding hinge that is mounted in a portable electronic device to allow the cover to slide relative to the base.

2. Description of the Prior Art

With progress in technology, a portable electronic device provides greater ability to integrate multiple electronic devices into one. For example, a cell phone that can take photos and play music integrates functions of a camera and a player with a cell phone. By integrating more functions, the portable electronic device requires more control buttons for additional functions. However, more control buttons occupy more space, against miniaturization trends.

Thus, the present invention provides a sliding hinge to provide more space for more control buttons without increasing footprint of the portable electronic device when not used.

SUMMARY OF THE INVENTION

The main objective of the present invention is to provide a sliding hinge for a portable electronic device that provides more space for control buttons without increasing a footprint thereof during non-use. The sliding hinge has a stationary leaf, a link assembly, a main sliding leaf and a side sliding leaf. The linking assembly is mounted pivotally on the stationary leaf via a pivoting middle. The main and side sliding leaves are connected respectively to two ends of the linking assembly. With the linking assembly, the main and side sliding leaves are moved simultaneously. Therefore, when the portable electronic device is not used, the main and side sliding leaves fully overlap with the stationary leaf to achieve a smallest footprint. When the portable electronic device performs multiple functions, the main and side sliding leaves are slid out to reveal control buttons.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
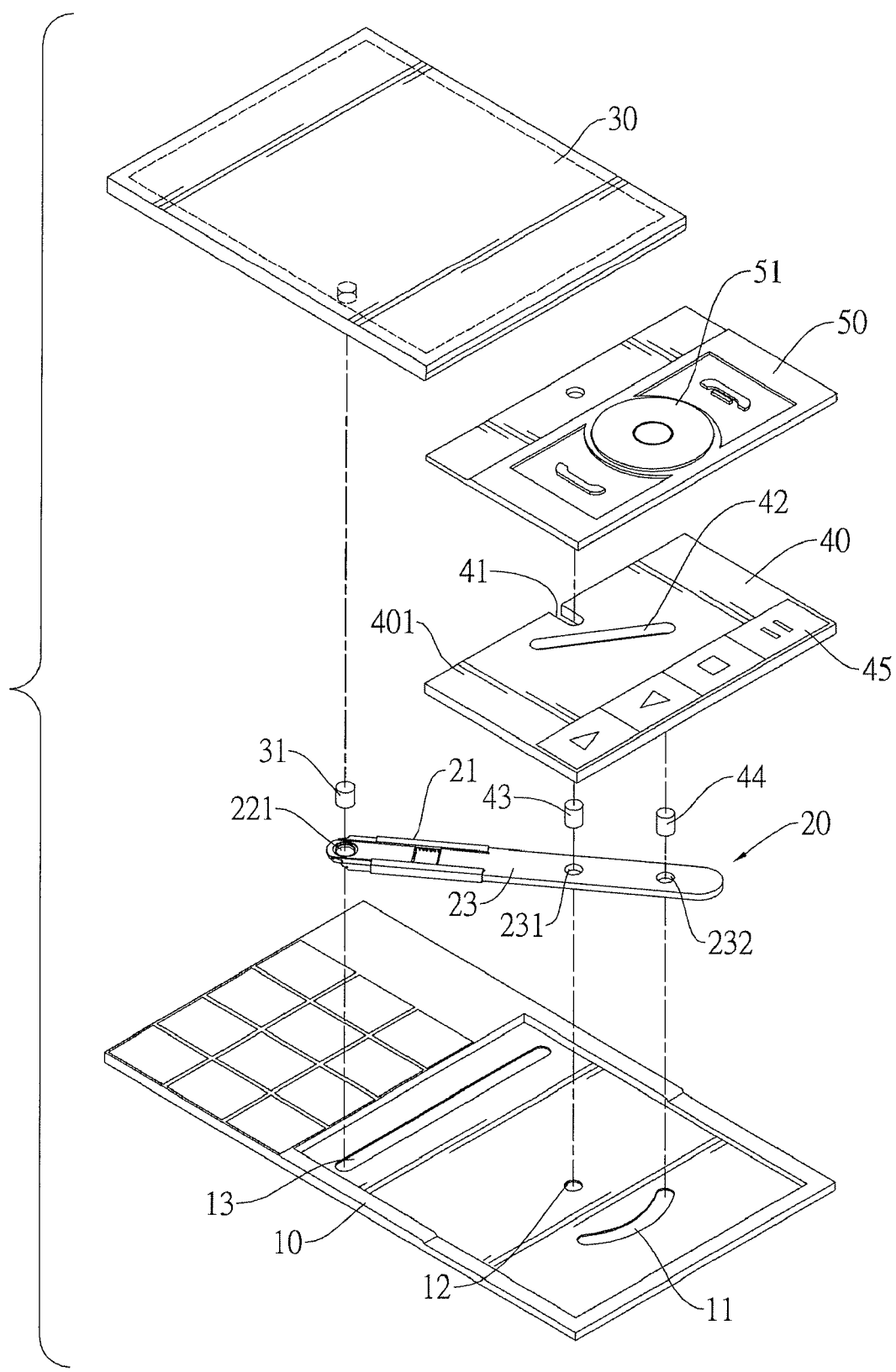
FIG. 1 is an exploded perspective view of a portable electronic device in accordance with the present invention with a sliding hinge in accordance with the present invention.

With reference to FIG. 1, a sliding hinge in accordance with the present invention comprises a stationary leaf (10), a linking assembly (20), a main sliding leaf (30) and a side sliding leaf (40).

The stationary leaf (10) has a limiting element, a guiding channel (11) and a pivoting hole (12). The limiting element is formed on a front surface of the stationary leaf (10) and may be a limiting channel (13) formed in the front surface of the stationary leaf (10). The guiding channel (11) is curved and is formed in the front surface of the stationary leaf (10). The pivoting hole (12) is formed in the front surface of the stationary leaf (10) and is formed between the limiting element and the guiding channel (11).

The linking assembly (20) is mounted pivotally on the stationary leaf (10). The linking assembly (20) has two sliding ends and a central pivot disposed between its two sliding ends.

Figure 2:
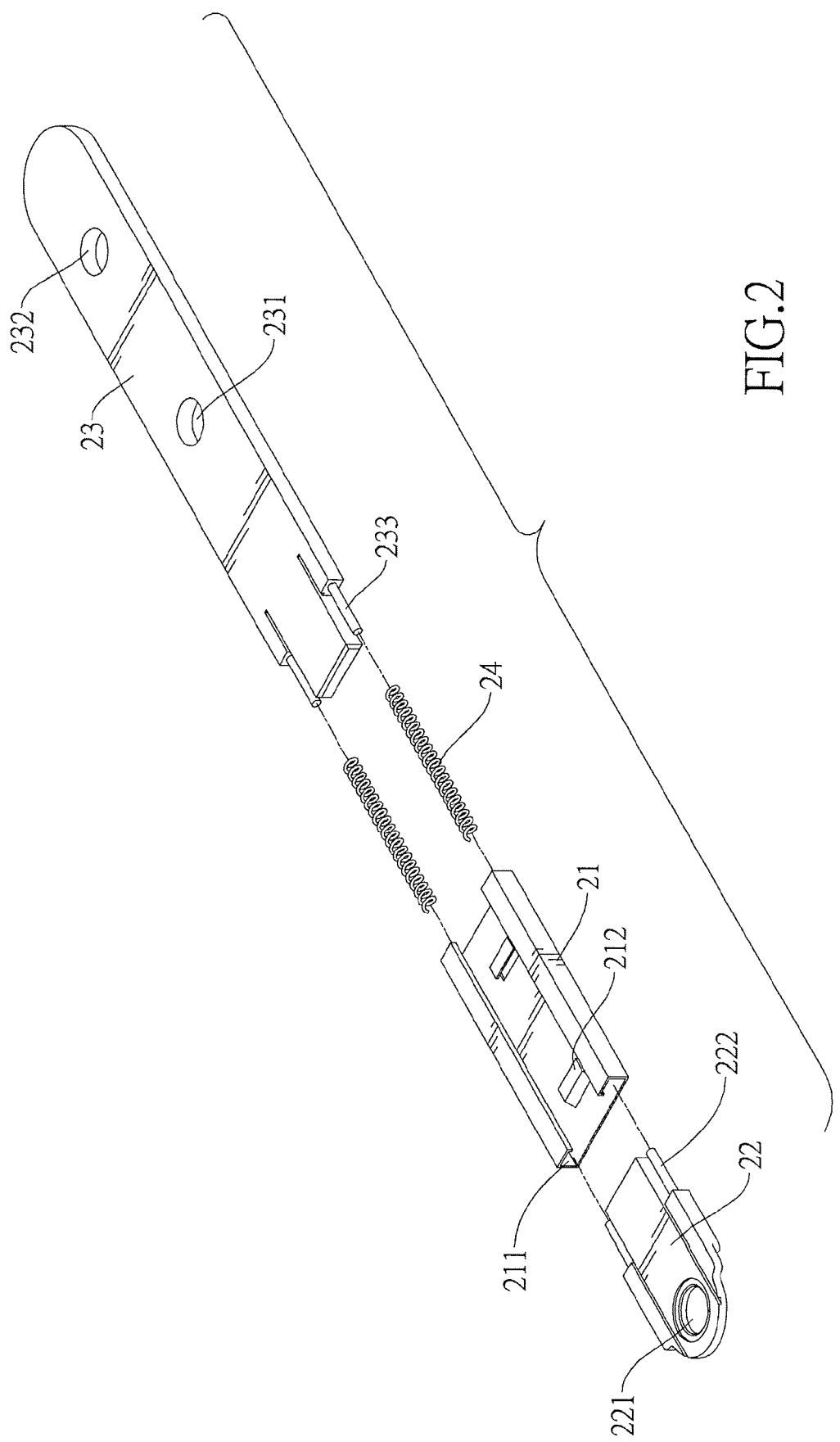
FIG. 2 is an exploded perspective view of a linking assembly of the portable electronic device in FIG. 1.

With further reference to FIG. 2, the linking assembly (20) may have a bracket (21), a limiting bar (22), a guiding bar (23) and two resilient elements (24). The bracket (21) has two mounting recesses (211) formed in its two sides and two stops (212) formed on a front surface of the bracket (21). The limiting bar (22) is connected movably to one end of the bracket (21), is selectively blocked by one stop (212) and has a through hole (221) and two protrusions (222). The through hole (221) aligns with the limiting channel (13). The protrusions (222) protrude out from two sides of the limiting bar (22) and are mounted respectively in the mounting recesses (211) of the bracket (21). The guiding bar (23) is connected movably to the other end of the bracket (21), is selectively blocked by the other stop (212) and has a pivoting hole (231), a through hole (232) and two protrusions (233). The pivoting hole (231) of the guiding bar (23) aligns with the pivoting hole (12) of the stationary leaf (10). The through hole (232) aligns with the guiding channel (11). The protrusions (233) protrude out from two sides of the guiding bar (23) and are mounted respectively in the mounting recesses (211) of the bracket (21). The resilient elements (24) may be springs and are mounted respectively in the mounting recesses (211) of the bracket (21). Each resilient element (24) is mounted between a corresponding protrusion (222) of the limiting bar (22) and a corresponding protrusion (223) of the guiding bar (23).

Figure 5:
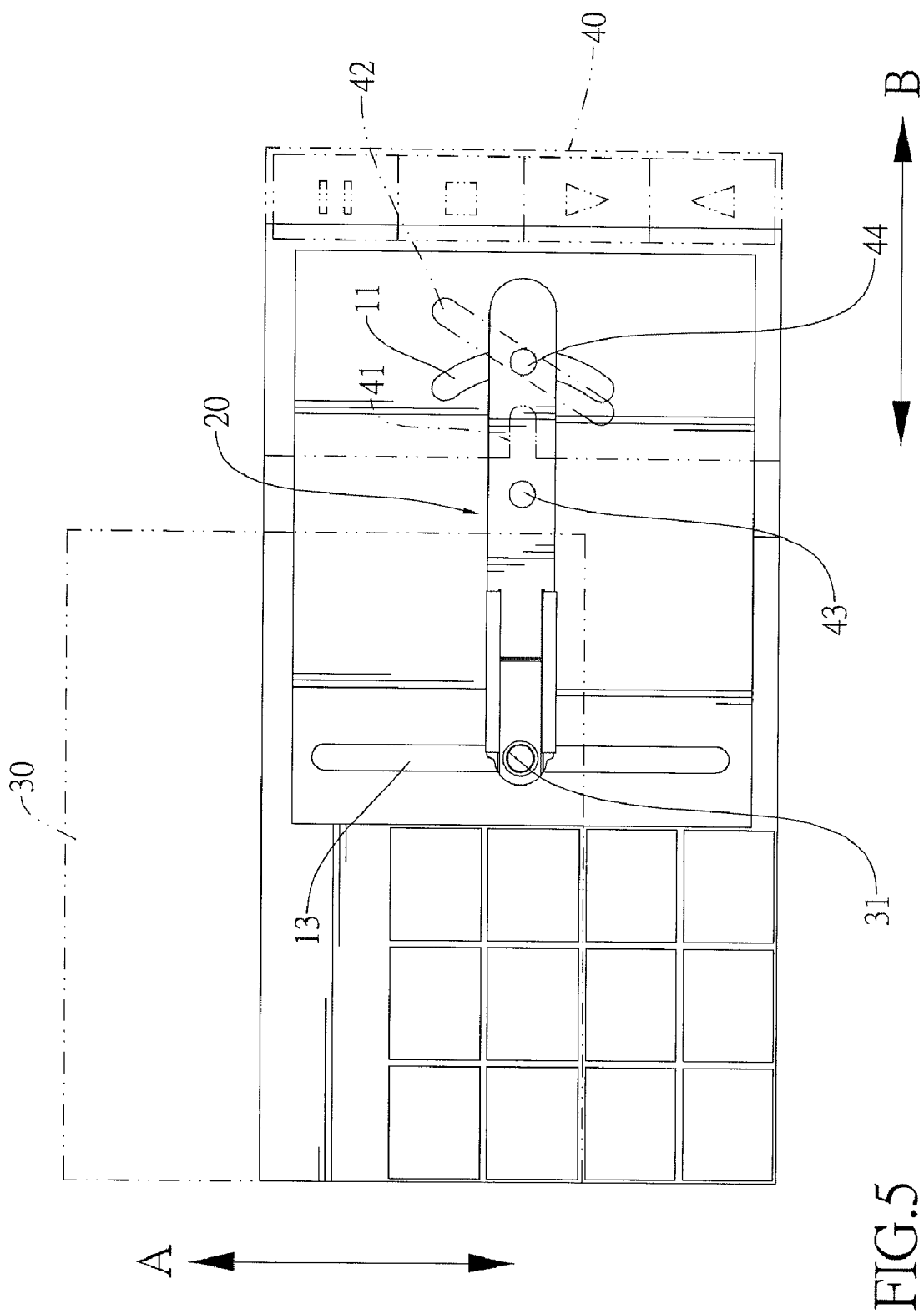
FIG. 5 is an operational front view of the portable electronic device in FIG. 1, showing internal elements and the main and side sliding leaves open.

With further reference to FIG. 5, the main sliding leaf (30) is mounted slidably on and overlaps the front surface of the stationary leaf (10) and is connected to one sliding end of the linking assembly (20). The main sliding leaf (30) is adapted to slide in a first sliding direction (A). In a preferred embodiment, the first sliding direction (A) of the main sliding leaf (30) is kept straight by the limiting element of the stationary leaf (10). However, the limiting element of the stationary leaf (10) may vary according to practical demands, and the limiting channel (13) may be in a shape of curve line so that the first sliding direction (A) may follow the shape of the limiting channel (13). A main sliding pin (31) is attached to the main sliding leaf (30), is mounted through the through hole (221) of the limiting bar (22) and slides in the limiting channel (13).

The side sliding leaf (40) is mounted slidably on and overlaps the front surface of the stationary leaf (10), is connected to the other sliding end of the linking assembly (20). The side sliding leaf (40) is adapted to slide in different direction with the main sliding leaf (30) and may slide in a second sliding direction (B). The side sliding leaf (40) has a guiding notch (41) and an actuating slot (42). An included angle between the second sliding direction (B) and the first sliding direction (A) is smaller than 180 degrees and may be preferably 90 degrees. The guiding notch (41) is formed in a side (401) of the side sliding leaf (40). A pivoting pin (43) is mounted through the pivoting hole (231) of the guiding bar (23) and the pivoting hole (12) of the stationary leaf (10) and is selectively received in the guiding notch (41). The actuating slot (42) is inclined relative to the side (401) of the side sliding leaf (40) and is connected to the corresponding sliding end of the linking assembly (20). A side sliding pin (44) is mounted through the through hole (232) of the guiding bar (23) and slides in the actuating slot (42) and the guiding channel (11).

A portable electronic device in accordance with the present invention comprises the sliding hinge as described and a control panel (50).

The stationary leaf (10) has multiple electric components inside and a keyboard (14) formed thereon. The main sliding leaf (30) has a screen formed thereon. The side sliding leaf (40) has multiple control buttons (45) formed thereon. The control panel (50) with multiple control buttons (51) is connected securely to the stationary leaf (10) and the central pivot of the linking assembly (20) and overlaps the side sliding leaf (40).

Figure 3:
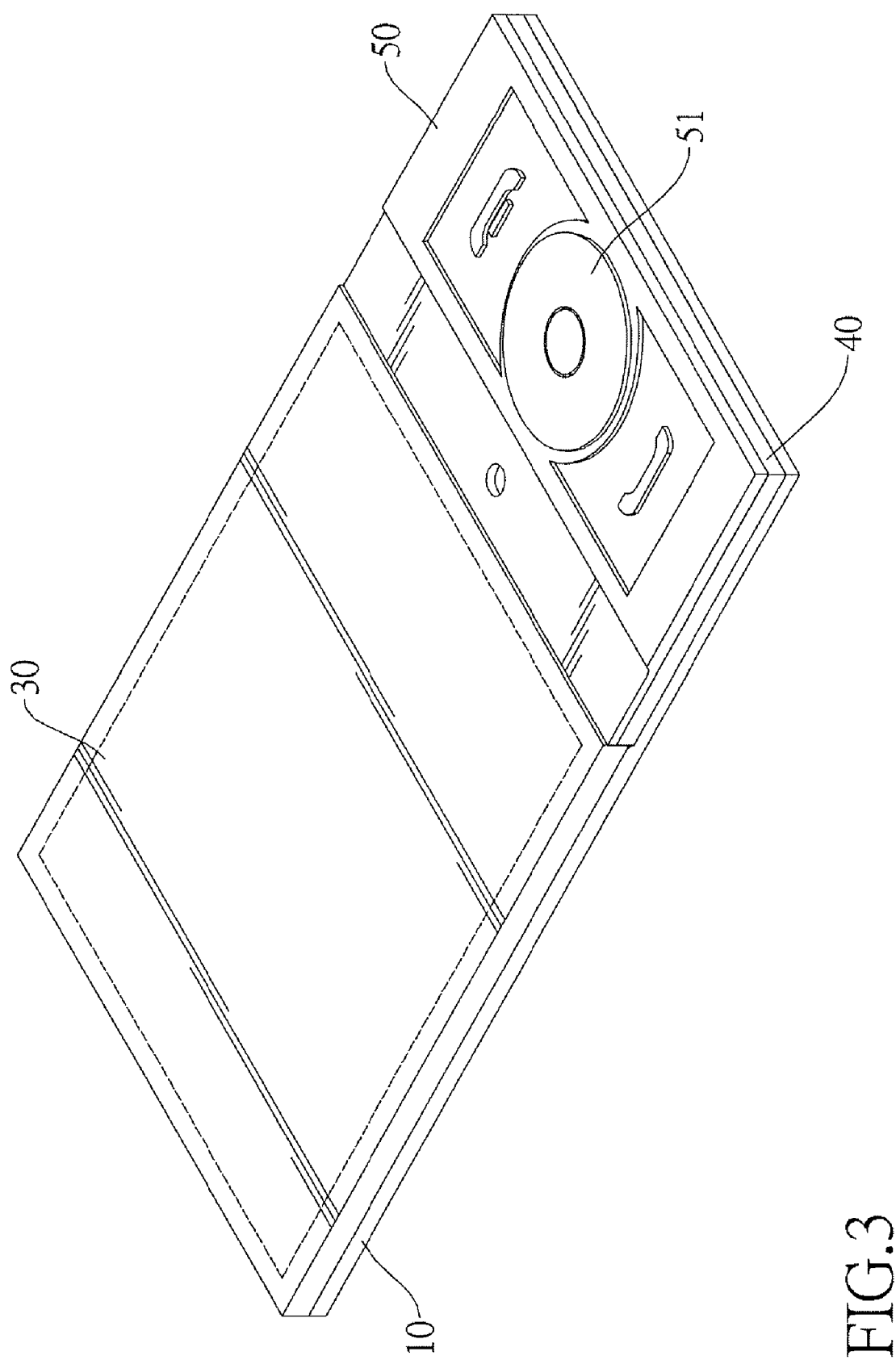
FIG. 3 is a perspective view of the portable electronic device in FIG. 1.
Figure 4:
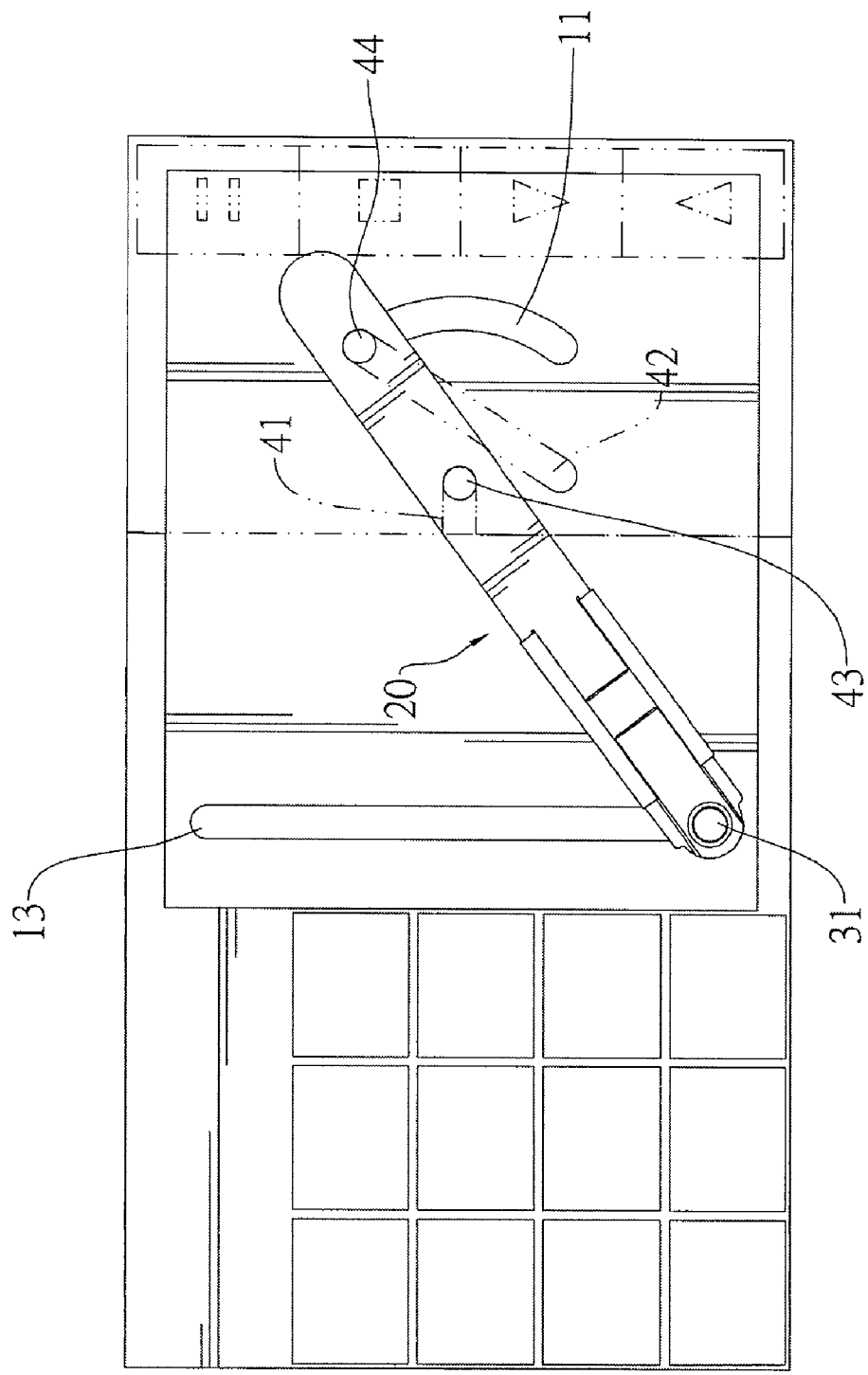
FIG. 4 is a front view of the portable electronic device in FIG. 1 showing internal elements.

With further reference to FIGS. 3 and 4, the portable electronic device as described is shown retracted. The front surface of the stationary leaf (10) is fully covered by main sliding leaf (30) and the control panel (50), and the side sliding leaf (40) is fully retracted between the stationary leaf (10) and the control panel (50). The main sliding pin (31) abuts the bottom end of the limiting channel (13), the pivoting pin (43) is received in the guiding notch (41), and the side sliding pin (44) abuts the top ends of the guiding channel (11) and the actuating slot (42). Preferably, the main sliding pin (31), the pivoting pin (43) and the side sliding pin (44) are kept stable via the resilient elements (24). The control buttons (51) on the control panel (50) can be used to input commands.

With further reference to FIG. 5, the main sliding leaf (30) is pushed to slide upward. The linking assembly (20) is pivoted and the resilient elements (24) inside are compressed. The main sliding pin (31) slides in the limiting channel (13), the pivoting pin (43) leaves the guiding notch (41), and the side sliding pin (44) slides in the guiding channel (11) and the actuating slot (42). Since the actuating slot (42) is inclined, the side sliding pin (44) sliding in the guiding channel (11) forces the side sliding leaf (40) to move transversely.

Figure 6:
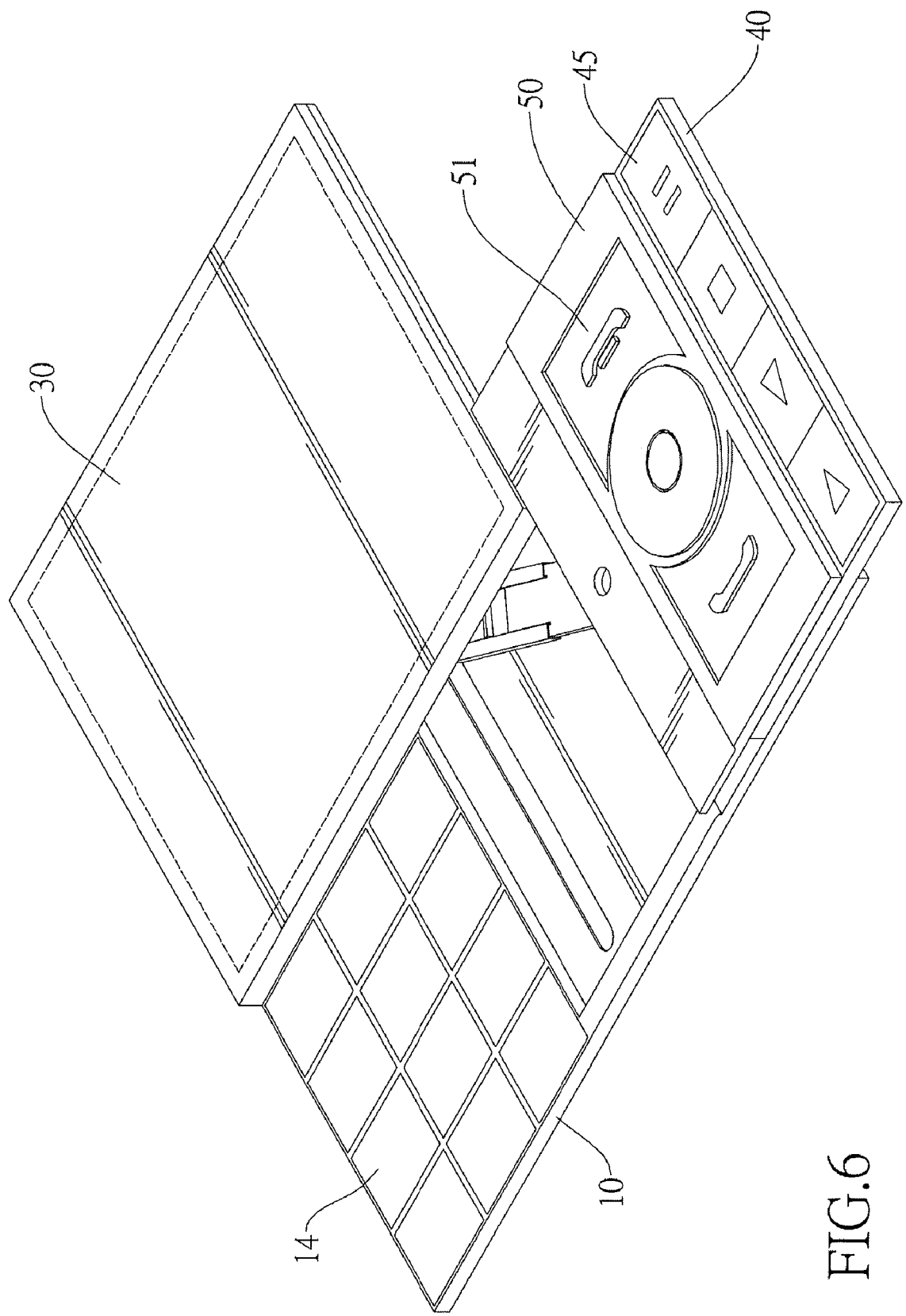
FIG. 6 is an operational perspective view of the portable electronic device in FIG. 1, shown fully opened.
Figure 7:
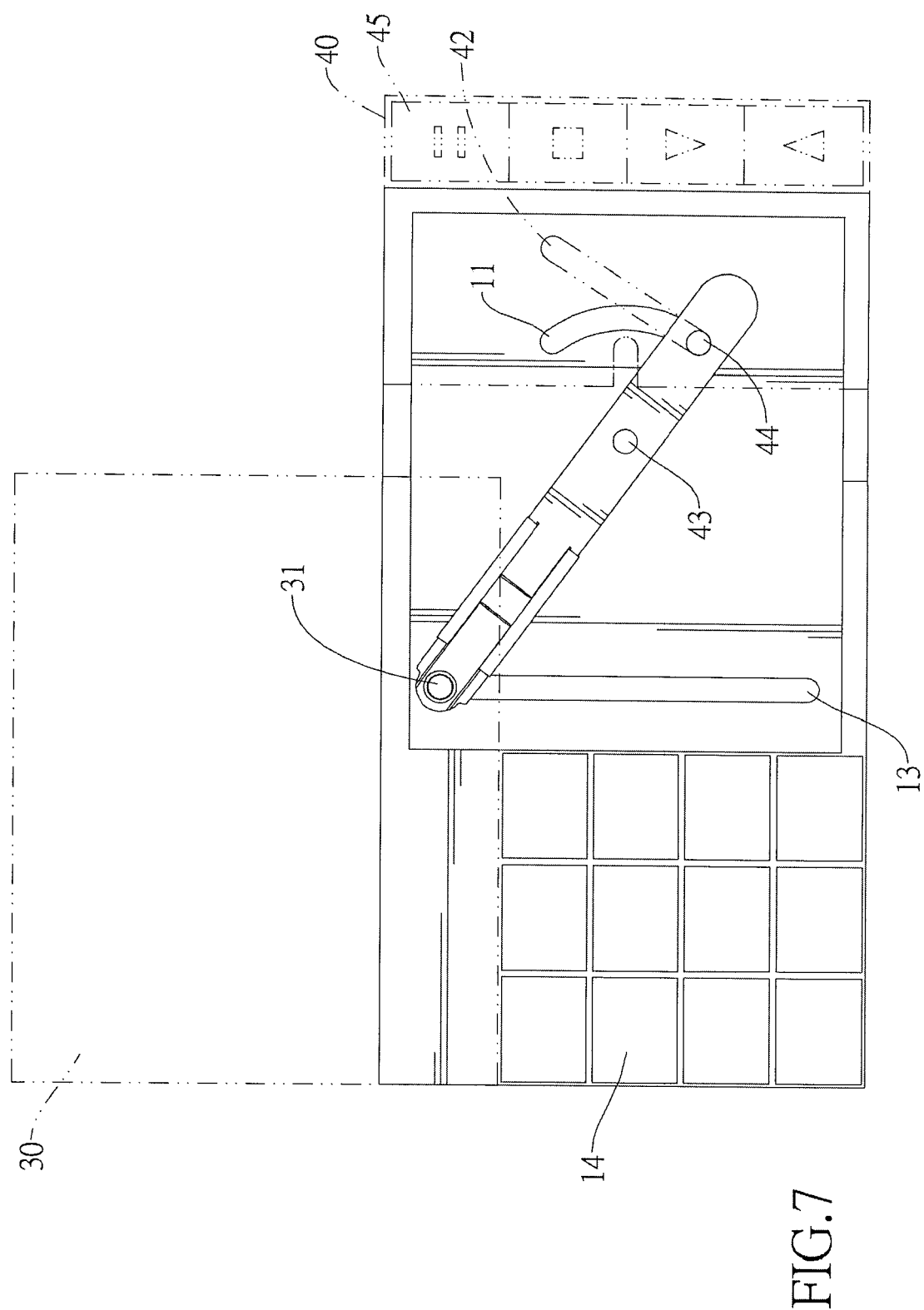
FIG. 7 is an operational front view of the portable electronic device in FIG. 1, shown with partial phantom lines and fully opened.

With further reference to FIGS. 6 and 7, the main sliding leaf (30) is pushed to reveal a complete keyboard (14). The main sliding pin (31) abuts the top end of the limiting channel (13), and the side sliding pin (44) abuts the bottom ends of the guiding channel (11) and the actuating slot (42). Preferably, the main sliding pin (31) and the side sliding pin (44) are kept stable via the resilient elements (24). The side sliding leaf (40) is also slid out to reveal the control buttons (45). Therefore, the control buttons (51) on the control panel (50), the keyboard (14) on the main sliding leaf (30) and the control buttons (45) on the side sliding leaf (40) can be used to input commands.

Figure 8:
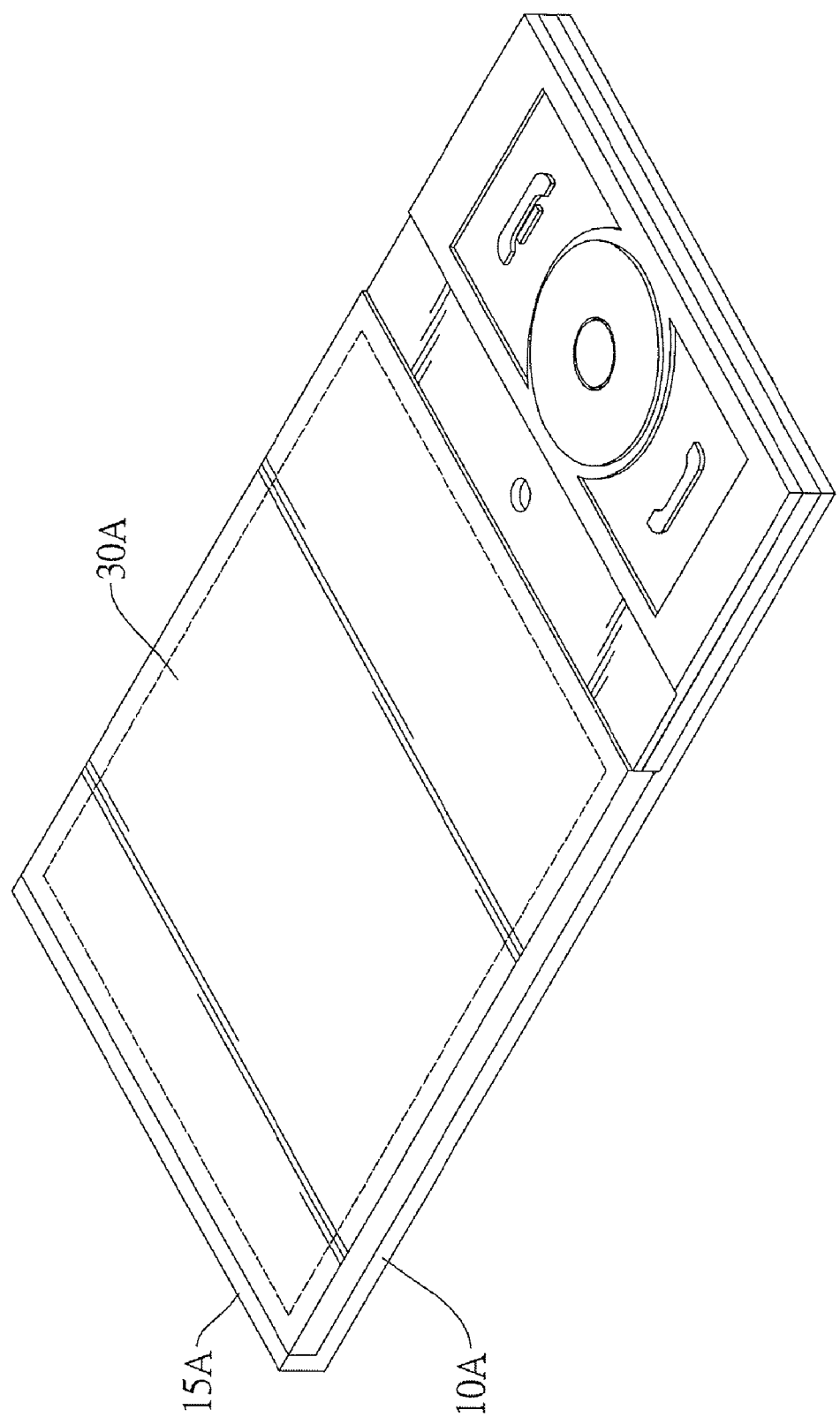
FIG. 8 is a perspective view of another embodiment of a portable electronic device in accordance with the present invention.
Figure 9:
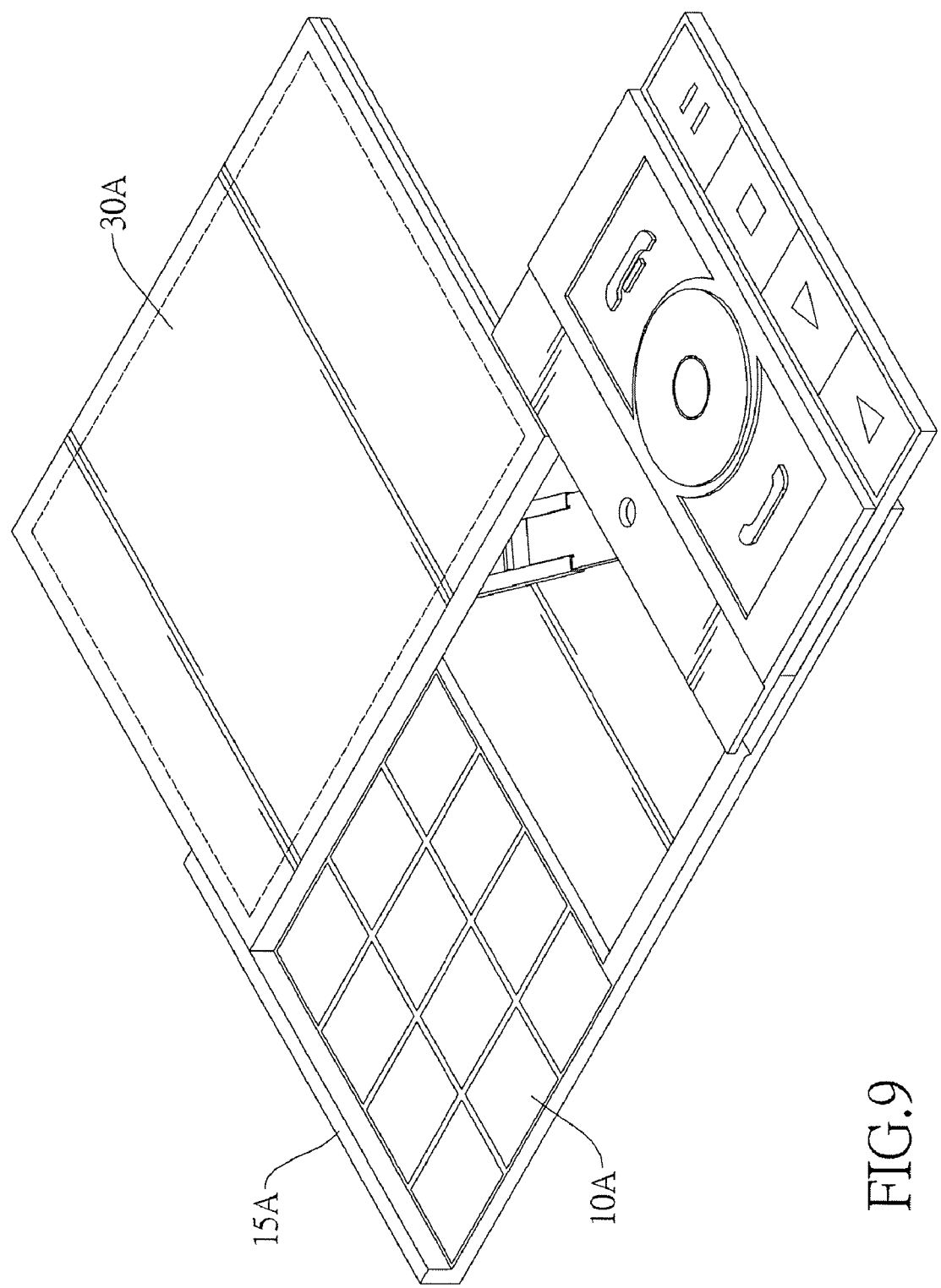
FIG. 9 is an operational perspective view of the portable electronic device in FIG. 8, showing fully opened.
Figure 10:
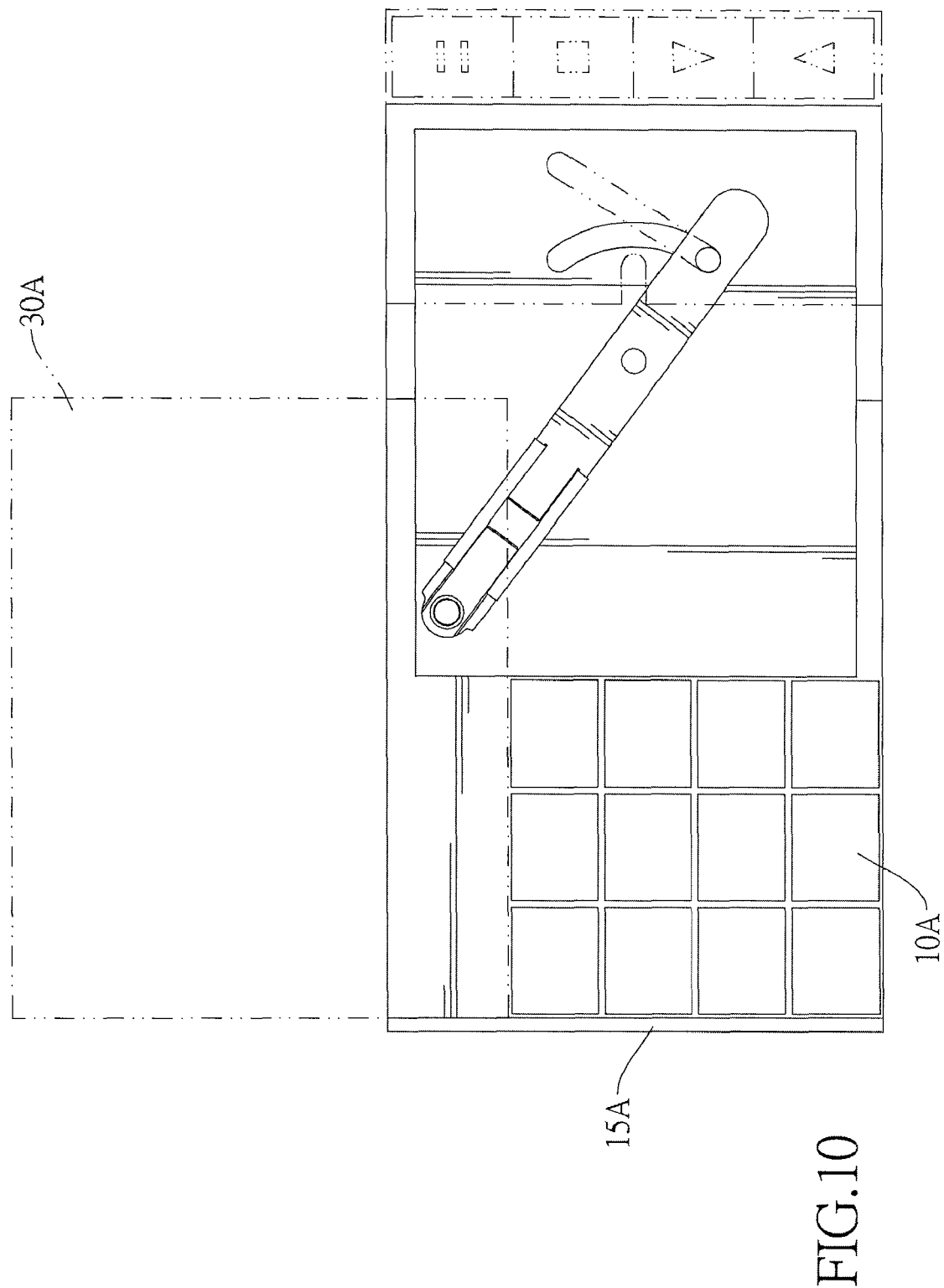
FIG. 10 is an operational front view of the portable electronic device in FIG. 8, shown in partial phantom lines and fully opened.

With reference to FIGS. 8 to 10, in another preferred embodiment, the limiting element of the stationary leaf (10A) is a limiting rib (15A) formed on an edge of the stationary leaf (10A) and abutting a side of the main sliding leaf (30A).

The present invention has multiple advantages. Since the linking assembly (20), the main sliding leaf (30) and the side sliding leaf (40) are moved simultaneously only the main sliding leaf (30) or the side sliding leaf (40) need be pushed to move both sliding leaves (30, 40). Furthermore, with the side sliding leaf (40), more control buttons are provided to be adapted for more functions. Moreover, the side sliding leaf (40) is fully retracted between the stationary leaf (10) and the control panel (50) so that the side sliding leaf (40) does not increase width and length of the portable electronic device when the side sliding leaf (40) is not used. Thus, the portable electronic device in accordance with the present invention provides more spaces for more control buttons without increasing a footprint when not in use so that the portable electronic device as described is convenient for storing and carrying while providing multiple convenient functions.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sliding hinge comprising:
   a stationary leaf;
   a linking assembly having two sliding ends and a central pivot mounted pivotally on the stationary leaf;
   a main sliding leaf mounted slidably on the stationary leaf, connected to one sliding end of the linking assembly and adapted to slide in a first sliding direction; and
   a side sliding leaf mounted slidably on the stationary leaf, connected to the other sliding end of the linking assembly, adapted to slide in a second sliding direction and having
      an actuating slot being inclined relative to a side of the side sliding leaf and connected to the corresponding sliding end of the linking assembly;
   wherein an included angle being between the first sliding direction and the second sliding direction is smaller than 180 degrees; and
   wherein when the main sliding leaf slides in the first sliding direction, the side sliding leaf is driven by the linking assembly to slide in the second sliding direction.

2. The sliding hinge as claimed in claim 1, wherein
   the stationary leaf has a limiting element formed on the front surface of the stationary leaf to maintain the side sliding leaf in a predetermined sliding direction; and
   the linking assembly has
      a limiting bar connected to the main sliding leaf;
      a guiding bar connected to the side sliding leaf; and
      at least one resilient element mounted between the limiting bar and guiding bar.

3. The sliding hinge as claimed in claim 2, wherein
   the stationary leaf has a curved guiding channel formed in the stationary leaf;
   the guiding bar of the linking element has a through hole aligning with the guiding channel; and
   a side sliding pin is mounted through the through hole of the guiding bar and slides in the actuating slot and the guiding channel.

4. The sliding hinge as claimed in claim 3, wherein
   the stationary leaf has a pivoting hole formed in the front surface of the stationary leaf and formed between the limiting element and the guiding channel;

the guiding bar of the linking element has a pivoting hole aligning with the pivoting hole of the stationary leaf; and a pivoting pin is mounted through the pivoting hole of the guiding bar and the pivoting hole of the stationary leaf.

5. The sliding hinge as claimed in claim 4, wherein the side sliding leaf has a guiding notch formed in the side of the side sliding leaf and selectively receiving the pivoting pin.

6. The sliding hinge as claimed in claim 5, wherein the limiting element is a limiting channel formed in the front surface of the stationary leaf;

the limiting bar of the linking assembly has a through hole aligning with the limiting channel; and a main sliding pin is attached to the main sliding leaf, is mounted through the through hole of the limiting bar and slides in the limiting channel.

7. The sliding hinge as claimed in claim 5, wherein the limiting element is a limiting rib formed on an edge of the stationary leaf and abutting a side of the main sliding leaf.

8. The sliding hinge as claimed in claim 2, wherein the limiting element is a limiting channel formed in the stationary leaf;

the limiting bar of the linking assembly has a through hole aligning with the limiting channel; and a main sliding pin is attached to the main sliding leaf, is mounted through the through hole of the limiting bar and slides in the limiting channel.

9. The sliding hinge as claimed in claim 2, wherein the limiting element is a limiting rib formed on an edge of the stationary leaf and abutting a side of the main sliding leaf.

10. A portable electronic device with a sliding hinge as claimed in claim comprising:

a control panel connected securely to the stationary leaf and the central pivot of the linking assembly and overlapping the side sliding leaf.

11. The portable electronic device as claimed in claim 10, wherein the stationary leaf has a keyboard formed on the stationary leaf;

the main sliding leaf has a screen formed on the main sliding leaf;

the side sliding leaf has multiple control buttons formed on the side sliding leaf; and the control panel has multiple control buttons formed on the control panel.

12. The portable electronic device as claimed in claim 11, wherein the side sliding leaf has an actuating slot being inclined relative to a side of the side sliding leaf and connected to the corresponding sliding end of the linking assembly.

13. The portable electronic device as claimed in claim 12, wherein the stationary leaf has a limiting element formed on the front surface of the stationary leaf to maintain the main side sliding leaf in a straight sliding direction; and the linking assembly has a limiting bar connected to the main sliding leaf;

a guiding bar connected to the actuating slot of the side sliding leaf; and at least one resilient element mounted between the limiting bar and guiding bar.

14. The electronic device as claimed in claim 13, wherein the stationary leaf has a curved guiding channel formed in the front surface of the stationary leaf;

the guiding bar of the linking element has a through hole aligning with the guiding channel; and a side sliding pin is mounted through the through hole of the guiding bar and slides in the actuating slot and the guiding channel.

15. The electronic device as claimed in claim 14, wherein the stationary leaf has a pivoting hole formed in the front surface of the stationary leaf and formed between the limiting element and the guiding channel;

the guiding bar of the linking element has a pivoting hole aligning with the pivoting hole of the stationary leaf; and a pivoting pin is mounted through the pivoting hole of the guiding bar and the pivoting hole of the stationary leaf.

16. The electronic device as claimed in claim 13, wherein the limiting element is a limiting channel formed in the front surface of the stationary leaf;

the limiting bar of the linking assembly has a through hole aligning with the limiting channel; and a main sliding pin is attached to the main sliding leaf, is mounted through the through hole of the limiting bar and slides in the limiting channel.

17. The electronic device as claimed in claim 13, wherein the limiting element is a limiting rib formed on an edge of the stationary leaf and abutting a side of the main sliding leaf.

* * * * *